(12) United States Patent
Giering

(10) Patent No.: US 9,031,307 B2
(45) Date of Patent: May 12, 2015

(54) APPARATUS AND METHOD FOR CHECKING DOCUMENTS OF VALUE

(75) Inventor: Thomas Giering, Kirchseeon (DE)

(73) Assignee: Giesecke & Devrient GmbH, Munich (DE)

( * ) Notice: Subject to any disclaimer, the term of this patent is extended or adjusted under 35 U.S.C. 154(b) by 1821 days.

(21) Appl. No.: 10/574,665

(22) PCT Filed: Oct. 5, 2004

(86) PCT No.: PCT/EP2004/011136
§ 371 (c)(1),
(2), (4) Date: Mar. 13, 2007

(87) PCT Pub. No.: WO2005/036481
PCT Pub. Date: Apr. 21, 2005

(65) Prior Publication Data
US 2007/0189595 A1    Aug. 16, 2007

(30) Foreign Application Priority Data
Oct. 8, 2003 (DE) .................................. 103 46 636

(51) Int. Cl.
| | |
|---|---|
| G06K 9/00 | (2006.01) |
| G07D 7/12 | (2006.01) |
| B42D 25/30 | (2014.01) |
| G06K 19/14 | (2006.01) |
| G07D 7/20 | (2006.01) |

(52) U.S. Cl.
CPC ........ *G07D 7/122* (2013.01); *H04N 2201/3235* (2013.01); *B42D 25/30* (2014.10); *G06K 19/14* (2013.01); *G07D 7/20* (2013.01)

(58) Field of Classification Search
None
See application file for complete search history.

(56) References Cited

U.S. PATENT DOCUMENTS

| | | | | |
|---|---|---|---|---|
| 3,679,314 | A * | 7/1972 | Mustert | 356/71 |
| 4,189,235 | A * | 2/1980 | Guter et al. | 356/239.1 |
| 4,386,432 | A | 5/1983 | Nakamura et al. | |
| 4,451,521 | A * | 5/1984 | Kaule et al. | 428/199 |
| 4,592,090 | A * | 5/1986 | Curl et al. | 382/135 |
| 4,650,319 | A * | 3/1987 | Stenzel et al. | 356/51 |
| 4,723,072 | A | 2/1988 | Naruse | |
| 5,652,802 | A * | 7/1997 | Graves et al. | 382/135 |
| 5,678,677 | A * | 10/1997 | Baudat | 194/206 |
| 5,876,068 | A * | 3/1999 | Schneider et al. | 283/86 |
| 6,363,164 | B1 * | 3/2002 | Jones et al. | 382/135 |
| 6,636,624 | B2 * | 10/2003 | Raterman et al. | 382/135 |
| 6,741,727 | B1 * | 5/2004 | Hirasawa | 382/112 |
| 6,840,365 | B2 | 1/2005 | Löffler | |
| 6,937,322 | B2 * | 8/2005 | Gerz et al. | 356/71 |
| 6,974,623 | B2 * | 12/2005 | Schwenk | 428/199 |

(Continued)

FOREIGN PATENT DOCUMENTS

| | | |
|---|---|---|
| DE | 23 66 274 | 11/1973 |
| DE | 102 56 114 | 6/2004 |

(Continued)

*Primary Examiner* — Aaron W Carter
(74) *Attorney, Agent, or Firm* — Workman Nydegger

(57) ABSTRACT

The invention relates to an apparatus and a method for checking documents of value having luminescent feature substances. By carrying out the evaluation of the captured luminescence radiation on the basis of an integrated luminescence measuring, which is obtained by integrating the measured luminescence radiation of a track extending transversely across the document of value, a particularly easy capturing and differentiation even of faintly glowing feature substances is permitted.

23 Claims, 3 Drawing Sheets

(56) References Cited

U.S. PATENT DOCUMENTS

| | | | |
|---|---|---|---|
| 7,330,606 B2* | 2/2008 | Yakhini et al. | 382/294 |
| 7,426,291 B2* | 9/2008 | Okamura | 382/137 |
| 8,616,584 B2* | 12/2013 | Scholz et al. | 283/91 |
| 2001/0014169 A1* | 8/2001 | Liang | 382/135 |
| 2003/0136837 A1* | 7/2003 | Amon et al. | 235/435 |
| 2006/0153437 A1* | 7/2006 | Rauscher et al. | 382/135 |
| 2007/0095891 A1* | 5/2007 | Giering et al. | 235/379 |
| 2008/0135780 A1* | 6/2008 | Giering et al. | 250/459.1 |
| 2009/0051158 A1* | 2/2009 | Scholz et al. | 283/92 |
| 2009/0074229 A1* | 3/2009 | Giering et al. | 382/100 |

FOREIGN PATENT DOCUMENTS

| | | |
|---|---|---|
| EP | 0 744 716 | 11/1996 |
| GB | 2 122 743 | 1/1983 |
| GB | 2 122 743 | 1/1984 |
| WO | WO 01/48311 | 7/2001 |

* cited by examiner

APPARATUS AND METHOD FOR CHECKING DOCUMENTS OF VALUE

FIELD OF THE INVENTION

The invention relates to an apparatus and a method for checking in particular the authenticity and/or the nominal value of documents of value with luminescent feature substances, wherein the document of value is irradiated with light and the luminescence radiation emitted by the document of value is captured, in order to determine, whether the expected luminescent feature substance is actually present in the checked document of value.

BACKGROUND

Within the terms of the present invention, a luminescent feature substance is a substance consisting of one single component or of a mixture of a plurality of components, which show a luminescence behavior. These feature substances, which e.g. can be present in the form of pigments, are contained in the document of value itself and/or are applied thereon. Such documents of value can be e.g. bank notes, checks, chip cards, ID documents, passports or the like.

There exists a number of known systems for checking such documents of value. One system is described in the DE 23 66 274 C 2 of the applicant. In this system a bank note is inserted in a checking device, is irradiated at certain points and the remitted fluorescence radiation is captured in a spectrally resolved manner, in order to determine, whether a fluorescent authenticity feature is actually present in the bank note to be checked. The feature substances detected with such an apparatus usually are located in a defined spatially limited area of the bank note.

From the WO 01/48311 A2 of the applicant is further known, that for differentiating different nominal values of a currency system the bank notes have a coding, in which as luminescent feature substances mottled fibers are incorporated in areas of the bank note surface separated from each other. In this case the coding is represented by a defined different geometric arrangement of these partial areas or by the type or presence or absence of the mottled fibers in these partial areas.

For measuring the mottled fibers incorporated in the known discrete areas of the bank note surface, the bank notes are separately scanned along a measuring track extending in transport direction, in order to determine the type or presence or absence of mottled fibers in the individual areas of the measuring track and their distance to each other. With that the coding of the checked bank note can be determined.

But it has turned out, that these known systems have a low measuring sensitivity, in particular with feature substances having a low luminescence intensity that are incorporated in the document of value in a not locally concentrated fashion, but distributed over a large surface.

SUMMARY

On these premises it is the problem of the present invention to provide an apparatus and a method for checking documents of value with luminescent feature substances, which permit a high measuring accuracy even with feature substances having a low luminescence intensity distributed over a large surface or low concentrations of feature substances.

The present invention thus is based on the principle to add up the luminescence radiation that is emitted by an illuminated track of the document of value extending transversely across the document of value. This integration of the measured values of the luminescence radiation over an area, that extends transversely across the bank note from one edge to an edge located opposite thereto, permits an especially secure recognition even of luminescent feature substances with low luminous intensity. When the feature substances to be checked are present randomly distributed in the document of value, even fluctuations can be compensated, which my arise during a local measuring due to fluctuations in quantities of the feature substances in different areas of the document of value. A further advantage of the integration is the reduced evaluation time connected therewith.

The checking according to the invention can be carried out, for example, by a bank note being transported past a light source with pertinent sensor sensing luminescence radiation, which illuminates the bank note when it is transported past along a track, that extends from an edge located on the front when viewed in transport direction to a trailing edge of the bank note located opposite thereto. The luminescence radiation emitted by this measuring track is then time-integrated, e.g. with the help of a spectrometer, and captured preferably in a spectrally resolved manner. The integrated luminescence radiation, i.e. the luminescence measuring preferably integrated with respect to both intensity and spectral distribution, then can be compared to predetermined reference values or reference areas, in order to check the presence or absence of the expected luminescent feature substances, such as e.g. luminescent pigments in the document of value. When comparing, for example, a determination of the spectral distance can be carried out, as described in DE 102 56 114 A1 of the applicant.

BRIEF DESCRIPTION OF THE DRAWINGS

In the following the invention is explained in more detail and described with reference to the accompanying figures.

DETAILED DESCRIPTION OF THE PREFERRED EMBODIMENTS

Figure 1:
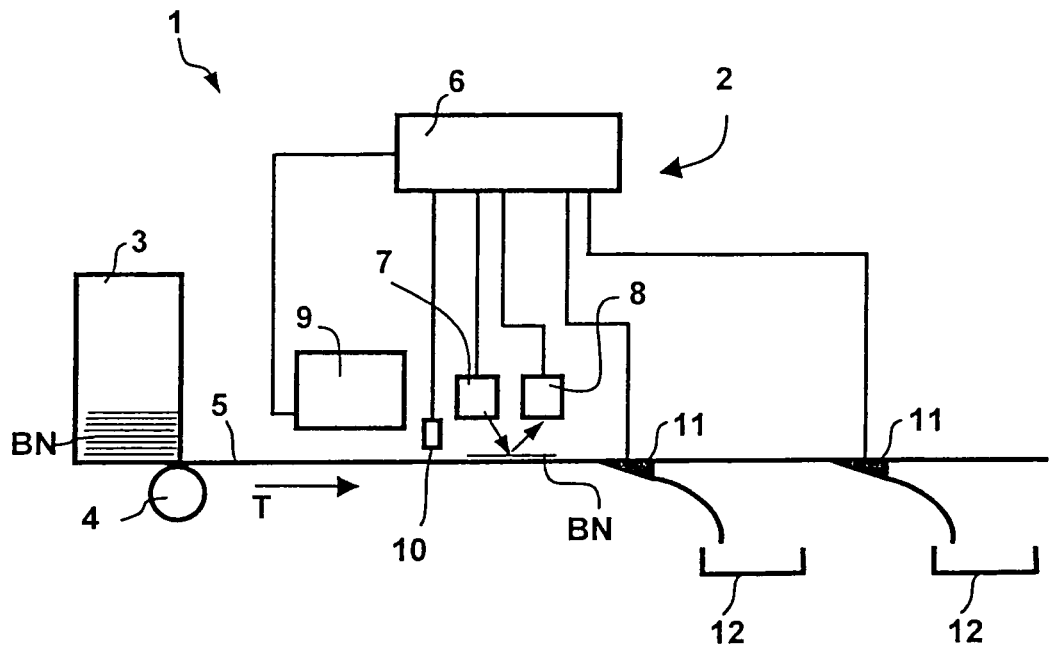
FIG. 1 in a schematic side view shows the structure of a bank note sorting machine with a checking apparatus according to the invention according to a first embodiment.

Although the checking apparatus according to the invention can be used in all bank note processing machines, such as e.g. in money depositing machines, vending machines or handheld checking devices, in the following by way of example and with reference to the FIG. 1 the use in a bank note sorting machine 1 is described, which is shown in a schematic side view.

The bank note sorting machine 1 in the way known in the art comprises an input pocket 3, in which the bank notes BN to be checked are inserted in a stacked fashion. These bank notes then are separately removed from the stack with the help of a singler 4 and are transported along a transport path 5 past a checking apparatus 2. The checking device 2 has an EDP-aided evaluation unit 6, which is connected with an illuminating apparatus 7 for exciting the luminescent feature substances 15 in the bank note paper and a sensor device 8 for detecting luminescence radiation and a light barrier 10, which is located immediately upstream of the illuminating apparatus 7 and the sensor device 8. Beside the light barrier 10 the transport path 5 can contain further not shown light barriers, as to be able to clearly determine the position of the individual bank notes BN in the transport path 5. Furthermore, the sensor device 2 can have a state sensor 9, which in particular serves for determining the degree of soiling of the bank notes BN. A plurality of diverters 11 are located downstream of the checking device 2, so as to give out the bank notes into one of a plurality of pockets 12 dependent on the checking result obtained in the evaluation unit 6.

The bank note sorting machine 1 in particular is characterized by the structure and the mode of functioning of the checking apparatus 2, which serves for detecting luminescent feature substances in the bank notes BN.

Figure 2:
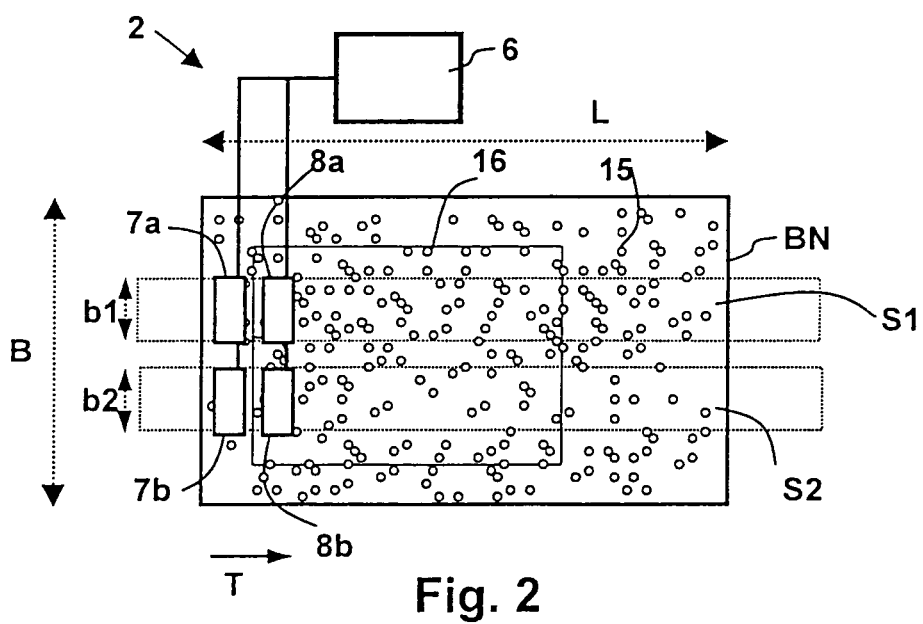
FIG. 2 shows a schematic view from above onto a part of the checking apparatus according to FIG. 1.

As it can be recognized in the representation of FIG. 2, the bank notes BN to be checked in particular have circularly drawn pigments 15, which are incorporated both in the printed image schematically marked by the line 16 and outside thereof over a large surface in the paper. The luminescent feature substances, i.e. in this case the pigments 15, can be both incorporated in the paper of the bank notes BN and applied onto it e.g. by printing.

As shown in the FIG. 2, the illuminating apparatus 7 has two light sources 7a and 7b, which are adapted to illuminate each of the bank notes BN passing the light sources 7a or 7b in transport direction T along a spaced apart track S1 or S2. For detecting the luminescence radiation emitted by the illuminated tracks S1, S2, the sensor device 8 has two equidistantly disposed sensors 8a, 8b, the sensor 8a being able to capture the luminescence radiation of the track S1 and sensor 8b the luminescence radiation of the track S2. Preferably, spectrometers are used as sensors 8a, 8b, in order to be able to capture the intensity of the luminescence radiation in a spectrally resolved fashion.

The illumination by the light sources 7a, 7b here, preferably, is effected continuously. But when the light sources 7a, 7b illuminate the bank notes BN over a large surface, when these are transported past, a pulsed illumination with a plurality of pulses per track S1, S2 is also possible. The spectrum of the light sources 7a, 7b of course is chosen such that the luminescent feature substances 15 to be checked are excited as to luminescently glow.

In order to carry out the integration of the entire emitted luminescence radiation of the tracks S1 or S2 along the length L of the bank note BN, the sensors 8a, 8b are actuated by the evaluation unit 6 such that they add up, i.e. integrate all captured luminescence radiation within a predetermined time interval after the upstream light barrier 10 having detected the leading edge of the bank note BN. Consequently, the time interval is determined such that the luminescence radiation within the tracks S1 or S2 is measured for the entire length L of the bank note BN. Instead of an integrated measuring also a plurality of discrete measured values corresponding to the luminescence radiation at different areas along the measuring track S1, S2 can be obtained, when transporting the bank note BN past the sensor 8 within the terms of the present invention, and these discrete measured values then are added up. Preferably, for this purpose 10 measured values, especially preferred at least 20 measured values, are added up per measuring track.

Instead of or in particular in addition to the leading edge also the trailing edge of the bank note BN can be detected, in order to set the time frame for the integrated measuring of the luminescence. This proceeding is of advantage in particular when the length of the bank note BN to be checked is not yet known. The detection of the trailing edge preferably is also effected with the help of the upstream light barrier 10.

As already mentioned, the luminescence radiation is captured in an integrated fashion preferably with respect to both intensity and spectral distribution. Preferably, the measuring is effected in the invisible spectral region, i.e. in the range of 750 to 2300 nanometers. In this spectral region the measuring is effected especially preferred in specific, optionally, spectrally spaced-apart subareas. Preferably the measuring is effected in a broadband fashion with a bandwidth of about 50 to 250 nanometers. Complementary, a time-resolved evaluation of the integrated luminescence measuring can also be carried out, in order to take into account the decay behavior when evaluating, such as e.g. the decay time of the luminescence radiation.

The signals on the integrated luminescence radiation obtained in this way then are compared to predetermined reference values or reference areas, in order to determine whether indeed the expected luminescence radiation of a true bank note has been measured. By integrating along the tracks S1, S2 there can be obtained a signal, which permits a secure recognition even of feature substances 15 distributed over a large surface and only faintly glowing.

By evaluating not only the intensity, but in combination therewith also the spectral distribution and/or the time history, i.e. in particular of the decay behavior of the integrated luminescence measuring, even a feature substance 15 applied onto or incorporated in the bank note paper in random distribution can be checked especially precisely.

Preferably, when the sensors 8a, 8b sense different measuring tracks S1, S2, they will show a different spectral behavior, such as e.g. measure in different spectral regions. In particular with feature substances 15 distributed over a large surface in the paper, a cost-efficient sensor arrangement can be realized without it being necessary that each individual sensor 8a, 8b has to be sensitive in all spectral regions to be checked.

If the expected luminescence radiation is different for different bank notes, i.e. e.g. the spectral distribution of the luminescence radiation as a coding is different for different nominal values and/or series, i.e. different editions of a currency system, the evaluation of the luminescence radiation can also be used for distinguishing between the different codings that correspond to the different nominal values.

Alternatively, with a separate sensor, e.g. by optically capturing the printed image, a determination of the nominal value can be carried out, and the measured signals of the luminescence radiation then only have to be compared to the reference value or reference area corresponding to this nominal value.

Analogously, for example it is also thinkable, that with the help of the state sensor 9 at first the state of the checked bank note BN is determined and this state then is taken into account when evaluating the luminescence radiation. This is of advantage at least when not only the spectral distribution of the luminescence radiation of the bank notes BN is checked, but also its absolute intensity, since e.g. soilings or crumples decrease this intensity.

As to obtain a sufficient measuring accuracy with feature substances 15 usually distributed over a large surface, with the help of the integration of the luminescence radiation over the entire length L of the bank note BN in transport direction it may be even enough, when the total dimension (here: widths) b1+b2 of all illuminated tracks S1 and S2 perpendicular to the transport direction amounts to less than the total dimension (width) B, in particular less than half of the dimension (width) B of the bank note BN.

If the luminescence radiation, however, shall be captured in a spatially resolved manner perpendicular to the transport direction T and thus perpendicular to the integration direction, the total width b1+b2 of all illuminated tracks S1 and S2 preferably amounts to more than half of the total width B.

Preferably, the measuring is effected in a wavelength range larger than 800 nanometers, especially preferred larger than 1000 nanometers. This has the advantage that the usually commercially available sensors, such as e.g. Si-sensors, which are especially sensitive in the visible spectral region, cannot be used by forgers as to optimize the forged bank notes, i.e. to find out which forgeries are recognized as allegedly "true" by the sensors.

The above with reference to FIG. 2 describes the case, in which the substances 15 to be checked are incorporated in the paper of the bank note BN to be checked over a large surface and in random distribution during manufacturing. But it is also thinkable, e.g. corresponding to the teaching of the WO 01/48311 A2 of the applicant, that the bank note BN along its length L has a plurality of equidistant areas 17a, 17b, 17c, 17d, in which either substances 15 are incorporated as luminescent feature substances or not.

Figure 3:
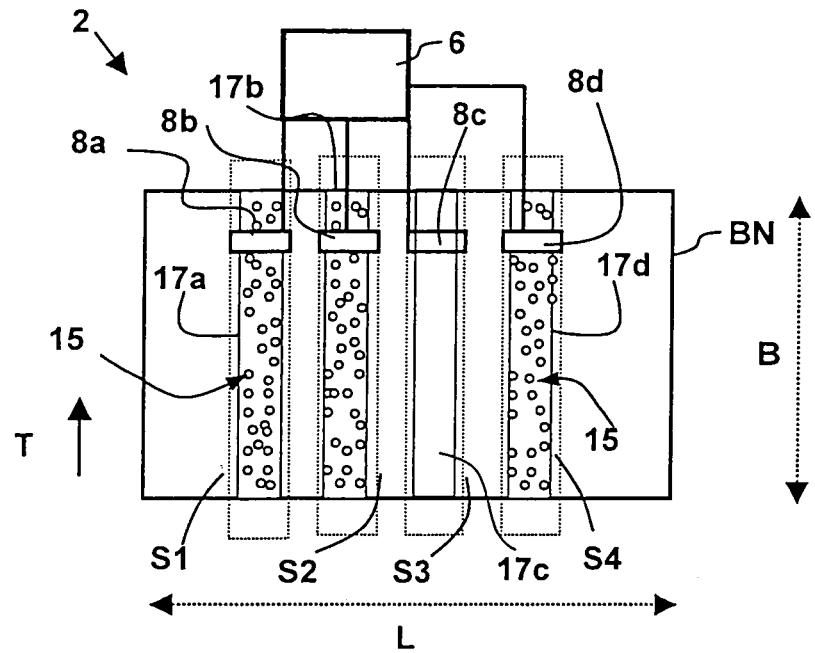
FIG. 3 shows a second embodiment of a checking apparatus according to the invention in a view corresponding to that of FIG. 2.

In the example shown in FIG. 3 substances 15 are present, for example, only in the areas 17a, 17b and 17d and not in the area 17c. It shall be mentioned, that the borders of the individual areas 17a to 17d drawn in FIG. 3 only serve for illustrating and do not have to be really present in the paper.

Additionally or alternatively to the coding as already described above realized by selecting feature substances with different luminescence behavior, said incorporation of the feature substances 15 in defined areas of the bank note BN can also be used as a coding. Beside the authenticity also the nominal value of the bank note can be checked, when different nominal values of a currency have different codings.

Therefore, the coding can be formed by both the geometric distribution, i.e. the presence or absence in defined spaced-apart areas and/or the different types of the luminescent feature substances.

For checking the coding of such bank notes BN the checking apparatus 2 of FIG. 3 has a sensor device with four sensors 8a, 8b, 8c, 8d disposed perpendicular to the transport direction T, which each measures in an integrated fashion the luminescence radiation emitted by the tracks S1, S2, S3 or S4 over the total width B of the bank note BN extending in transport direction T. In FIG. 3, analogous to the embodiment according to FIG. 2 and corresponding to the arrangement of the sensors 8a-8d associated light sources are provided, which for clarity's sake are not shown in the Figure.

This embodiment of the checking apparatus 2 has the advantage, that by evaluating the signals of the individual sensors 8a to 8d even with luminescent feature substances 15 luminescing only very faintly in the individual areas 17a to 17d, not only the presence or absence of the feature substances 15 can be determined, but also their spatial coding.

Figure 4:
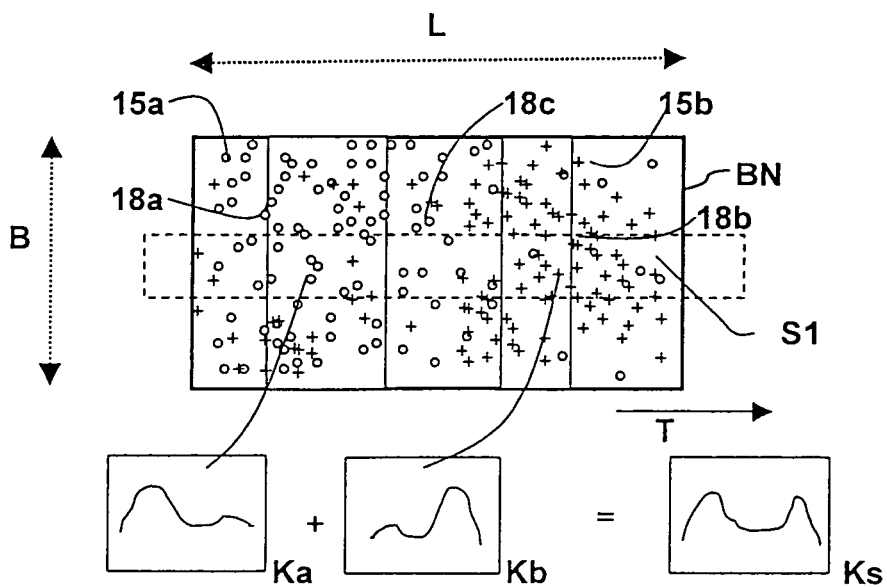
FIG. 4 shows a further embodiment of a checking apparatus according to the invention in a view corresponding to that of FIG. 2.

With reference to FIG. 4 now a further embodiment of a checking apparatus according to the invention is described. The measuring preferably is effected by a not shown sensor along at least one measuring track S1 extending in transport direction T.

The bank note BN to be checked has two differently luminescing feature substances 15a and 15b, which are schematically illustrated as circles 15a or crosses 15b in FIG. 4. These feature substances 15a,b are incorporated in the paper over a large surface and in random distribution. In an area 18a, as a result of chance, there are present more feature substances 15a than feature substances 15b and in a different area 18b vice versa are present more feature substances 15b than feature substances 15a.

In the lower part of the FIG. 4 in the boxes Ka and Kb each associated to the respective areas 18a and 18b is schematically illustrated the luminescence spectrum, i.e. the dependence of the radiation intensity on the frequency of the luminescence radiation in the respective area 18a or 18b. It turns out, that the different distribution of quantities of the individual feature substances 15a, 15b in the areas 18a, 18b of the measuring track S1, results in significantly differing pertinent measuring curves Ka, Kb.

By said integrated measuring, wherein the measured values of the areas 18a and 18b and, optionally, further areas of the measuring track S1 are added up, as a result from the sensor 8 one obtains a signal corresponding to the representation in the box Ks, wherein both intensity and spectral distribution are integrated.

By integrating over the entire length L of the bank note BN extending in transport direction T thus an information about all the different feature substances 15a, 15b present in the area of the measuring track S1 can be obtained, which is independent of any quantity fluctuations of the individual feature substances 15a, 15b in different areas 18, b of the measuring track S1.

Therewith, at least in the case the precise position of the feature substances 15a, 15b in the track S1 is not relevant for the coding, even different codings can be differentiated when different feature substances 15 are present in the tracks S1.

It shall be emphasized, that beside the integrated measuring of the luminescence radiation according to the invention preferably a spatially not-integrated measuring can also be carried out and taken into account when evaluating. In the case of FIG. 4 it is thinkable e.g. that not only the integrated spectrum Ks, but also the individual spectra Ka, Kb are determined and evaluated. With a geometric coding corresponding to FIG. 3, wherein the spacing between the individual feature areas 17a-17d is substantial, e.g. at first the integrated spectrum Ks can be analyzed and a statement can be given as to whether one of the possible codings is present at all, before by analyzing the individual spectra Ka, Kb a more precise evaluation is carried out as to determine which of the possible codings is actually present.

Beside the above-described examples, of course, numerous variants are thinkable.

It is also thinkable, that the individual measuring tracks S1 to S4 are disposed not spaced apart from each other, but directly adjoining each other, or at least only partially overlapping each other, or are disposed over the surface in a pure random distribution. In this case a measuring to a far extent perpendicular to the transport direction T can be performed. In addition, determining the feature substances in the individual tracks S1 to S4 depends less on the exact alignment of the bank notes BN with the sensors 8a-d during transportation.

When the coding is formed e.g. by a strip extending perpendicular to the transport direction T in which the luminescent feature substances 15 are present only in certain spaced-apart subareas of the strip, and/or different feature substances 15 are present in different subareas, the sensor 8 will also measure in a spatially resolved fashion in a direction perpendicular to the transport direction T, in order to be able to check the spacing between the individual subareas. As to obtain the spatial resolution, preferably a multiplicity of individual sensors 8a-d are disposed perpendicular to the transport direction T, that each can be read out separately.

Figure 5:
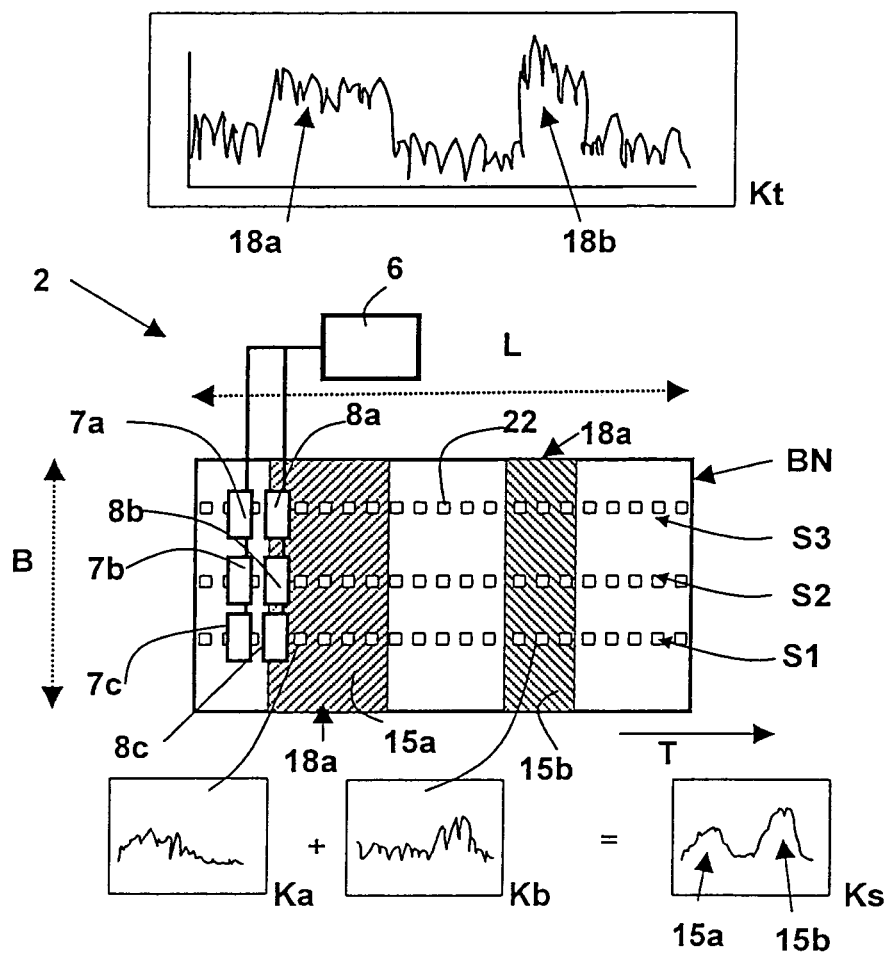
FIG. 5 shows a still further embodiment of a checking apparatus according to the invention in a view corresponding to that of FIG. 4.

FIG. 5 shows a further possible checking apparatus 2 in a schematic view similar to FIG. 4. The shown bank note BN to be checked by way of example has two hatched areas 18a, 18b, in each of which different feature substances 15a or 15b are present. The evaluation unit 6 is connected with three light sources 7a, 7b, 7c arranged in a row perpendicular to the transport direction T, which illuminate the bank note BN transported past along three tracks S1, S2 or S3. To each light source 7a-c is associated a sensor 8a, 8b or 8c, as to measure the radiation emitted by each of the illuminated tracks S1, S2 or S3. Per each track S1-S3 there are about twenty measured values 22 along the length L of the bank note BN, which are represented in the FIG. 5 by squares 22. It should be mentioned, that the number of light sources and sensors or measured values per track can vary.

The faintly luminescing feature substances 15a,b should be present only in very low concentrations in the respective areas 18a, 18b. This leads to the fact, that when performing a single measuring according to prior art, the signal-to-noise ratio is too weak as to produce signals even in highly sophisticated sensors, which permit a definite evaluation. This is illustrated by way of example in the lower half in the boxes Ka and Kb analogous to FIG. 4, which each represent a spectrally resolved single measuring at two of any measuring points 22 in the areas 18a or 18b of the track S1. When a plurality of sensors 8a-c are mounted perpendicular to the transport direction T, such as e.g. the three sensors 8a-c in FIG. 5, at the respective places along the length L per measuring point 22 three measured values are obtained, i.e. for each track S1-S3 one measuring value.

By adding up the measured signals Ka, Kb etc along the measuring track S1 or S2, S3 according to the invention, a signal is obtained, as shown in the box Ks, in which the signal-to-noise ratio is improved such that an interpretation of the spectrum of the entire bank note BN produced in this way is permitted. It can be clearly recognized, that the feature substances 15a and 15b are present in the bank note BN.

As already mentioned above, a spectrally resolved measuring can be effected such that as sensors 8a-c spectrometers are used and/or the individual sensors 8a to 8c each have different spectral properties, such as e.g. being sensitive at different wavelengths or in different wavelength ranges.

If in such a case, additional to the integration of the individual measuring points Ka, Kb along the transport direction T to form a total spectrum Ks, the bank note BN is measured with different spectral channels per measuring point 22, such as e.g. with the individual sensors 8a to 8c having different spectral properties, then it is, moreover, also of advantage, when per measuring point 22 a plurality of these channels are integrated. It is true that in this way one loses the spectral information at the measuring point 22, but one gains signal-to-noise ratio. This permits a statement on the spatial distribution of the feature substances 15a, 15b, which otherwise could disappear in the noise.

This is illustrated in the box Kt in the upper half of the FIG. 5, which represents the integrated signals of all sensors S1-S3 of the respective measuring points 22 spatially resolved over the length L. It is true that by this spectral integration one cannot distinguish, which of the feature substances 15a, 15b is actually present in the individual areas 18a, 18b. But in contrast to a not spectrally integrated measuring, one can already make a statement about the fact that luminescent feature substances 15a, 15b, optionally still to be determined in more detail, are present only in the areas 18a, 18b.

If in such a case one measures with a plurality of channels, i.e. here e.g. with a plurality of different sensors 8a-c perpendicular to the transport direction T, by integrating one obtains for each single measuring 22 via the sensors 8a-c, corresponding to the representation in the box Kt, the information on the distribution of the feature substance or feature substances 15a, 15b along the transport direction T and by integrating the single measuring per measuring channel the information on the distribution of the feature substance or the feature substances 15a, 15b perpendicular to the transport direction T. In both cases the signal-to-noise ratio is better than with the single measurings, for this reason it is also possible to evaluate signals that with single measurings lie in the noise.

The above is an example for the fact, that according to the present invention especially preferred there can be measured both in a spatially integrated and in a spectrally integrated manner. It should be mentioned, that it is not absolutely necessary that all measured values of the individual measuring points or spectral channels have to be added up. Preferably, however, at least a majority of all measured values is added up. It even can be of advantage for improving the signal-to-noise ratio, when only the measured values in the areas 18a, 18b are added up, in which according to a spectrally integrated evaluation, e.g. according to box Kt, the feature substances 15a, 15b should be present.

As described above, the individual sensors 8a to 8c according to the present invention can show a different spectral behavior. According to a further idea of the present invention, this can also apply to the individual light sources 7a to 7c.

This makes sense in particular when the individual sensors 8a-8c e.g. are adapted such that each of them recognizes a different feature substance. In this case the spectral behavior of the individual light sources 7a-c will be adapted such that they each excite the respective feature substance 15a, 15b to be detected in an appropriate fashion. In other words, there can be e.g. a sensor 8a for detecting a feature substance 15a and a different sensor 8b for detecting a different feature substance 15b.

The invention thus permits, in particular with the variant of integrating the measured values of luminescence only in transport direction T and not perpendicular thereto, an especially easy detection and differentiation even of differently luminescing and faintly glowing feature substances and thus the determination of authenticity and nominal value of bank notes BN.

The invention claimed is:

1. A method for checking authenticity and/or nominal value of documents of value with luminescent feature substances, comprising the steps:
    illuminating the document of value to be checked along a plurality of measuring tracks extending across the document of value thereby exciting the luminescent feature substance to emit luminescence radiation;
    measuring the luminescent radiation emitted by the luminescent feature substance of the illuminated document of value along the plurality of tracks;
    determining a plurality of measured values of the luminescence radiation emitted by the luminescent feature substance of the illuminated document of value along each of the plurality of measuring tracks;
    integrating the measured values for each of the plurality of tracks; and
    checking the authenticity and/or the nominal value of the document of value on the basis of the integrated measured values for each of the plurality of tracks,
    wherein the luminescent feature substances are checked and are incorporated in and/or applied onto the document of value in random distribution.

2. The method according to claim 1, wherein the step of integrating the measured values includes summing a plurality of discrete measured values of either or both of the luminescence radiation and a time-integrated measuring of the luminescence radiation.

3. The method according to claim 1, wherein the checking the authenticity and/or nominal value of the document of value is based both on the integrated luminescence measuring and not-integrated measured values of the luminescence radiation corresponding to different spatial areas of the respective measuring track.

4. The method according to claim 1, further comprising carrying out an in particular broadband evaluation of the spectral distribution of the integrated luminescence measuring.

5. The method according to claim 1, wherein the step of integrating the measured values includes integrating both with respect to the spatial distribution and/or the spectral distribution of the luminescence radiation.

6. The method according to claim 1, wherein the documents of value to be checked have different luminescent feature substances which are contained individually or in combination in the document of value, and
the method further comprises determining either or both of whether one of the different feature substances is contained in the checked document of value and which of the different feature substances is contained in the checked document of value.

7. The method according to claim 1, wherein further transporting the documents of value past an illuminating apparatus and a sensor device in a transport direction parallel to the tracks, wherein the sensor device is arranged to carry out the integrated luminescence measuring along the measuring tracks.

8. The method according to claim 1, wherein the plurality of parallel tracks overlap each other.

9. The method according to claim 1, wherein the tracks have a width in a direction perpendicular to the tracks and the illumination apparatus, and
the widths of all tracks is larger than the dimension of the document of value in the direction perpendicular to the tracks.

10. The method according to claim 1, wherein, in the step of illuminating the document of value, the document of value is illuminated with a continuous illumination.

11. The method according to claim 1, wherein, in the step of measuring the luminescent radiation, a spatially resolved measuring is performed in a direction along the track direction.

12. The method according to claim 1, wherein, in the step of measuring the luminescent radiation, a spectrally integrated measuring is performed in a direction along the track direction.

13. The method according to claim 1, wherein each of the plurality of tracks corresponds to one area of a coding.

14. The method according to claim 1, wherein the step of illuminating the document of value includes illuminating with a plurality of light sources having different spectral behaviors, and the step of measuring the luminescent radiation includes measuring with a plurality of sensors each having a different spectral behavior.

15. The method according to claim 1, wherein a time-resolved evaluation of the integrated luminescence measuring is carried out.

16. The method according to claim 1, wherein the integrated luminescence measuring is carried out in a wavelength range of more than 800 nanometers.

17. The method according to claim 1, further comprising at least one or more of counting documents of value, sorting the documents of value, depositing the documents of value, or paying out bank notes.

18. The method according to claim 1, wherein measuring the luminescent radiation includes measuring along a plurality of parallel tracks spaced apart from each other.

19. The method according to claim 1, wherein the tracks have a width in a direction perpendicular to the tracks and the sum of the widths of all tracks is smaller than the dimension of the document of value in the direction.

20. A non-transitory hardware storage device having stored computer-executable instructions which, when executed by at least one computing processor, implement the method according to claim 1.

21. An apparatus for checking documents of value with luminescent feature substances, comprising:
an illuminating apparatus for illuminating the document of value along a plurality of measuring tracks extending across the document of value and exciting the luminescent feature substances such that the luminescent feature substances emit luminescence radiation;
a sensor device for measuring the luminescence radiation emitted by the illuminated document of value;
an evaluation unit for carrying out the checking on the basis of the measured values of the sensor device;
wherein the illumination apparatus, the sensor device, and the evaluation unit are arranged to allow determining of a plurality of measured values of luminescence radiation along each one of the plurality of measuring tracks,
wherein the evaluation unit is arranged to integrate the measured values for each of the tracks and to carry out the checking on the basis of the results of the integrated measured values for each of the tracks, and
wherein the apparatus is configured to illuminate and measure the luminescent feature substances incorporated in and/or applied onto the document of value in random distribution.

22. A system comprising:
the apparatus according to claim 18, and
documents of value,
wherein the luminescent feature substances of the documents of value are incorporated in and/or applied onto the document of value in random distribution.

23. A computing device comprising:
at least one hardware processor; and
one or more non-transitory hardware storage media having stored computer-executable instructions which, when executed by the at least one hardware processor, implement a method for checking authenticity and/or nominal value of documents of value with luminescent feature substances, wherein the method comprises:
illuminating the document of value to be checked along a plurality of measuring tracks extending across the document of value thereby exciting the luminescent feature substance to emit luminescence radiation;
measuring the luminescent radiation emitted by the luminescent feature substance of the illuminated document of value along the plurality of tracks;
determining a plurality of measured values of the luminescence radiation emitted by the luminescent feature substance of the illuminated document of value along each of the plurality of measuring tracks;
integrating the measured values for each of the plurality of tracks; and checking the authenticity and/or the nominal value of the document of value on the basis of the integrated measured values for each of the plurality of tracks,
wherein the luminescent feature substances are checked and are incorporated in and/or applied onto the document of value in random distribution.

\* \* \* \* \*